United States Patent
Prieto et al.

(10) Patent No.: US 9,292,015 B2
(45) Date of Patent: Mar. 22, 2016

(54) UNIVERSAL CONSTRUCTION ROBOTICS INTERFACE

(71) Applicant: FLUOR TECHNOLOGIES CORPORATION, Aliso Viejo, CA (US)

(72) Inventors: Robert Prieto, Princeton Junction, NJ (US); Vikram Kapila, West Orange, NJ (US); Jared Alan Frank, Brooklyn, NY (US); David Alberto Lopez, Brooklyn, NY (US)

(73) Assignee: Fluor Technologies Corporation, Sugar Land, TX (US)

( * ) Notice: Subject to any disclaimer, the term of this patent is extended or adjusted under 35 U.S.C. 154(b) by 303 days.

(21) Appl. No.: 13/901,275

(22) Filed: May 23, 2013

(65) Prior Publication Data
US 2014/0350723 A1  Nov. 27, 2014

(51) Int. Cl.
| | |
|---|---|
| *B25J 9/16* | (2006.01) |
| *G06F 19/00* | (2011.01) |
| *G05B 19/409* | (2006.01) |
| *B25J 13/00* | (2006.01) |
| *G05B 19/04* | (2006.01) |

(52) U.S. Cl.
CPC .... *G05B 19/409* (2013.01); *G05B 2219/36137* (2013.01); *G05B 2219/36159* (2013.01)

(58) Field of Classification Search
CPC ............... G05B 19/409; G05B 2219/36137; G05B 2219/36159
See application file for complete search history.

(56) References Cited

U.S. PATENT DOCUMENTS

| | | | |
|---|---|---|---|
| 4,908,556 A | 3/1990 | Daggett | |
| 4,962,338 A | 10/1990 | Daggett | |
| 6,611,120 B2 | 8/2003 | Song | |
| 1,632,317 A1 | 3/2006 | Baba | |
| 8,060,251 B2 * | 11/2011 | Gonzalez-Banos et al. | .. 700/246 |
| 8,265,818 B2 | 9/2012 | Allport | |
| 2006/0074525 A1* | 4/2006 | Close et al. | ..... 700/245 |
| 2006/0212168 A1* | 9/2006 | Baba et al. | ...... 700/245 |
| 2008/0193260 A1 | 8/2008 | Yokokohji | |
| 2009/0037024 A1* | 2/2009 | Jamieson et al. | .... 700/264 |
| 2009/0265036 A1* | 10/2009 | Jamieson et al. | .... 700/259 |
| 2011/0257816 A1 | 10/2011 | Song | |

OTHER PUBLICATIONS

S. Verret and J. Collier, Internet Based Robot Control Using CORBA Based Communications, Defence R&D Canada, Technical Memorandum, Dec. 2009.
http://www.used-robots.com/articles.php?tag=1961 discloses a universal robotic programming language for controlling robots from different manufacturers; printed on May 23, 2013.

* cited by examiner

*Primary Examiner* — Khoi Tran
*Assistant Examiner* — Dale Moyer
(74) *Attorney, Agent, or Firm* — Conley Rose, P.C.; Kristin Jordan Harkins

(57) ABSTRACT

A method and a system of integrating a new robot into a work environment are provided. A controller receives a signal indicating a presence of a new robot in the work environment. The controller then establishes a negotiation channel between the controller and the new robot and begins to negotiate with the new robot a set of robotic functions controllable by the controller. Based on a comparison between a set of function attributes the new robot and interface attributes of the controller, the controller generates a new robot user interface for controlling the set of robotic functions of the new robot.

19 Claims, 7 Drawing Sheets

| Device Function Dictionary | |
|---|---|
| Controller Device /Controller | Interface Primitives/ Device Functions/Features |
| Controller 1 | iOS |
| | ON/OFF Button |
| | Touch Screen Display |
| | Touch & Tactile Keypad |
| | Bluetooth |
| | A-GPS |
| | Wifi enabled |
| | Camera |
| | 3D accelerator |
| Controller 2 | Android platform |
| | Barometer |
| | ON/OFF Button |
| | Scroll Ball |
| | Touch Display |
| | Smart Stay eye tracking |
| | Bluetooth |
| | Camera |
| | GPS |
| | Magnetometer |
| Controller 3 | Android platform |
| | ON/OFF Button |
| | Touch and Tactile Keypad |
| | Wireless FM Ttransmitter |
| | Scroll Ball |
| | Touch Display |
| | Bluetooth |
| | Temperature Sensor |

| Device Function Dictionary | |
|---|---|
| Controller Device /Controller | Interface Primitives/ Device Functions/Features |
| Controller 4 | Android platform |
| | ON/OFF Button |
| | Touch and Tactile Keypad |
| | Wireless FM Ttransmitter |
| | Scroll Ball |
| | Touch Display |
| | Bluetooth |
| | Temperature Sensor |
| Controller 5 | Symbian platform |
| | ON/OFF Button |
| | Tactile Keypad |
| | Wireless FM Ttransmitter |
| | Scroll Bar |
| | Touch Display |
| | Bluetooth |
| | Magnetometer |
| Controller 6 | iOS |
| | ON/OFF Button |
| | Touch Screen Display |
| | Touch & Tactile Keypad |
| | Infrared |
| | Barometer |
| | Wifi enabled |
| | Camera |
| | 3D accelerator |

Figure 4

| Robotic Function | Possible Device Control Recommendations |
|---|---|
| Move Left | Tilt the Device towards Left |
| | Press the Left Arrow icon |
| | Press Key 3 on keypad |
| Move Right | Tilt the Device towards Right |
| | Press the Right Arrow icon |
| | Press Key 4 on keypad |
| Move Forward | Tilt the Device upwards |
| | Press the UP Arrow icon |
| | Press Key 5 on keypad |
| Move Backward | Tilt the Device downwards |
| | Press the DOWN Arrow icon |
| | Press Key 6 on keypad |
| ON/OFF | Long Press 0 key |
| | Long Press # key |
| Rotate | Move the arrow icon clockwise or anti-clockwise |
| Bend Down | Double Tap on the GUI |
| | Press Key 6 |
| Take Picture | Press Key 8 |
| | Click Camera Icon on GUI |

Figure 5

| Robotic Function | Selected Device Control |
|---|---|
| Move Left | Tilt the Device towards Left |
| Move Right | Tilt the Device towards Right |
| Move Forward | Tilt the Device upwards |
| Move Backward | Tilt the Device downwards |
| ON/OFF | Long Press 0 key |
| Rotate | Move the arrow icon clockwise or anti-clockwise |
| Bend Down | Double Tap on the GUI |
| Take Picture | Press Key 8 |

Figure 6

UNIVERSAL CONSTRUCTION ROBOTICS INTERFACE

FIELD OF THE INVENTION

The present disclosure relates to robotic controllers, and more particularly, to robot integration and control in adaptive modular environments.

BACKGROUND

The background description includes information that may be useful in understanding the present disclosure. It is not an admission that any of the information provided herein is prior art or relevant to the presently claimed disclosure, or that any publication specifically or implicitly referenced is prior art.

Various work environments employ robots for automating multiple repetitive and non-repetitive tasks. Different robots can be deployed to perform a range of different activities such as, but not limited to, lifting, transportation, securing, monitoring and so on. Generally, in a modular work environment, such as a construction environment, different robots are assigned to different zones to perform specific site activities. Usually, these robotic activities require continuous operator control to ensure proper function and safety of the environment.

Several methods and systems for controlling robots have been developed. For example, U.S. Publication No. 2011/0257816A1 to Song et al., titled "Remote Control System and Method for Construction Equipment" filed Dec. 23, 2009, generally discloses a system for remotely controlling construction machines. Another example is EP Publication No. EP1632317A1 to Baba et al., titled "Robot Remote Control System" filed Jun. 12, 2003, which discloses a system for remotely controlling a robot using a public transmission system. Yet another example is U.S. Pat. No. 6,611,120 to Song et al., titled "Robot Cleaning System Using Mobile Communication Network", filed Mar. 18, 2002, which generally discloses a robot cleaning system. Specifically, Song describes using a mobile communication network to receive data (e.g., images or video) from a cleaning robot, and send command signal to the cleaning robot. Yet another example is U.S. Pat. No. 4,962,338 to Daggett et al., titled "Universal Robot Control Board Configuration", filed Jun. 21, 1988, which discloses a robot control that is arranged to enable different controls for varied types of robots to be readily assembled and packaged with use of a few standard boards (but the different boards that control different robots are d). Yet another example is U.S. Pat. No. 8,265,818 to Allport, titled "Open Architecture Command System" filed Jun. 4, 2009, which discloses a command and control system for controlling different heterogeneous robotic systems and sensors. Yet another example is Publication titled "Internet Based Robot Control Using CORBA" by Verret et al, dated December 2009 which discloses a web browser based GUI for controlling robots. Yet another example is Publication titled "Universal Robot Controller 3 (URC3)" located at URL www.used-robots.com/articles.php?tag=1961, which discloses a universal robotic programming language for controlling robots from different manufacturers. Yet another example is U.S. Publication No. 2008/0193260 to Yokokohji et al., titled "Remote Control Device", filed May 10, 2006, which describes a remote control device for remotely controlling a robot arm.

These and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

However, some of these above-mentioned references disclose robot control by controllers, which are butky, expensive and do not comply with the latest communication and control technologies.

In cases where the robot controllers comply with the latest communication and control technologies, (such as a scenario wherein the operators regulate such robots by implementing different control applications that reside in wireless handheld devices such as Android® Smartphones, iPhones®, iPads® and the like), it has been observed that different proprietary control applications are provided by the robot manufacturers. Such proprietary control applications are specific for the operating system of the handheld device, are limited to controlling a specific robot, and also in some cases, specific for each type of robotic function.

Thus, there exists a need for a solution that facilitates control of a robot from any location and by any operator irrespective of the type of robot; and mobile platform and operative system of the handheld device utilized by the operator.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value fatting within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

SUMMARY OF THE INVENTION

The inventive subject matter provides apparatus, systems and methods in which new robots can be integrated within a work ecosystem. In accordance with an embodiment disclosed herein, a method of integrating a new robot into a work environment is provided. The method includes the steps of receiving a signal indicating a presence of the new robot in the work environment by a controller. The method further includes establishing a negotiation channel between the controller and the new robot and negotiating, by the controller via the negotiation channel, with the new robot a set of robotic functions controllable by the controller. The method further includes selecting a set of selected interface primitives by comparing function attributes of the set of robotic functions to interface attributes of interface primitives and thereby generating a robot user interface from the set of selected interface primitives, wherein the robot user interface is configured to control the set of robotic functions. Finally, the method includes configuring the controller to provide access to the robot user interface within the work environment.

In accordance with another embodiment disclosed herein, a controller device for integrating a new robot into a working environment is provided. The controller device includes an interface configured to communicate with the new robot. The controller device further includes a registration module coupled with the interface. The registration module is configured to receive a signal indicating a presence of the new robot in the working environment and establish a negotiation channel with the new robot via the interface. The registration module further negotiates, via the negotiation channel, with the new robot a set of robotic functions controllable by the controller device and selects a set of selected interface primitives by comparing function attributes of the set of robotic functions to interface attributes of interface primitives to generate a robot user interface. The robot user interface is configured to control the set of robotic functions. The registration module further configures the controller device to provide access to the robot user interface within the work environment.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWINGS

FIG. 4 illustrates an example of a Device function dictionary.

FIG. 5 illustrates user interface implementation choices for controlling each robotic function.

FIG. 6 illustrates an example of user interface implementations selected for controlling a set of robotic functions.

DETAILED DESCRIPTION

Figure 1:
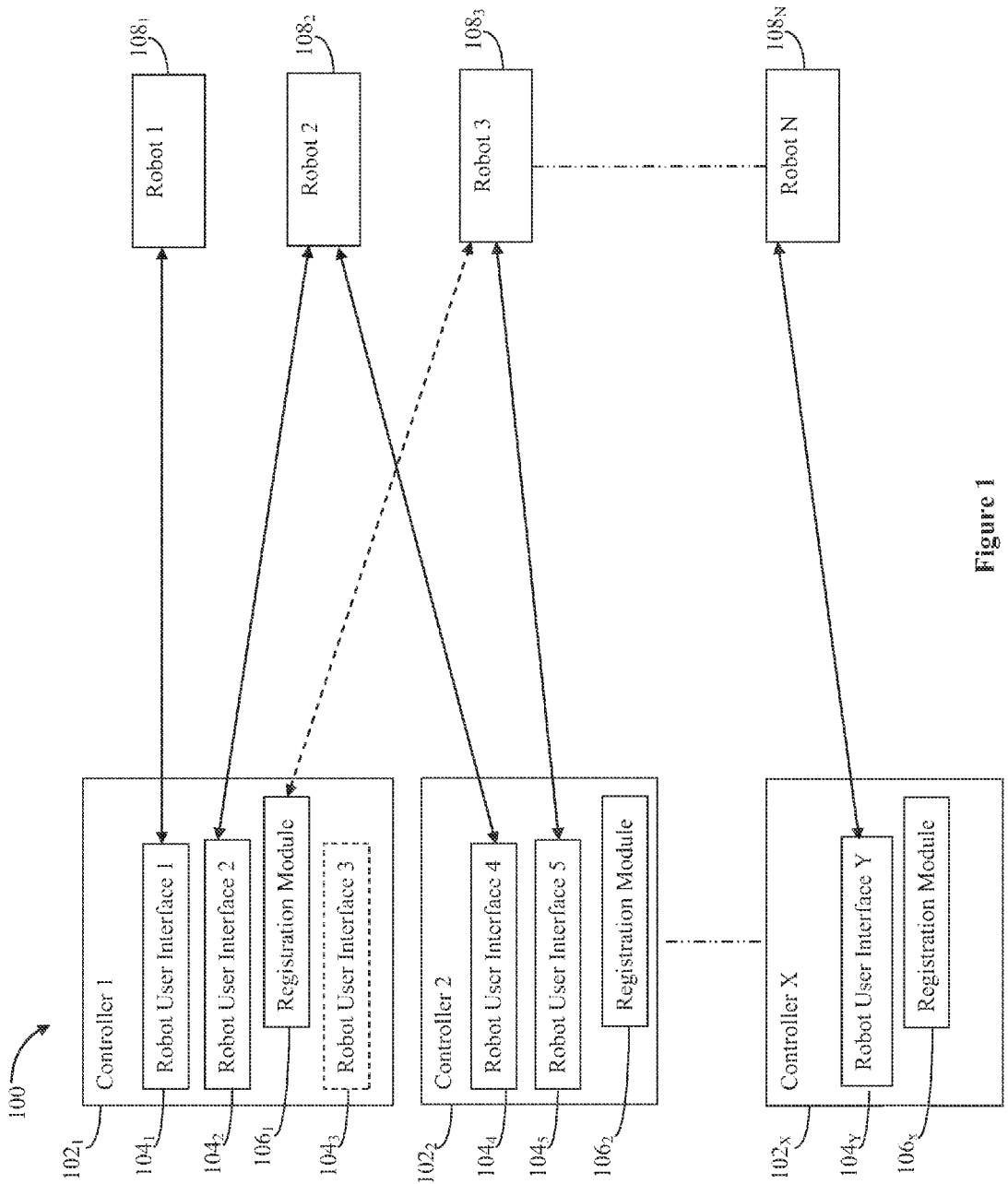
FIG. 1 illustrates a schematic block diagram of a work environment including a plurality of robots and a plurality of controllers.

It should be noted that while the following description is drawn to a computer/server based robotic management systems, various alternative configurations are also deemed suitable and may employ various computing devices including servers, interfaces, systems, databases, agents, peers, engines, controllers, modules, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network.

For the purpose of promoting an understanding of the principles of the disclosure, reference will now be made to the embodiment illustrated in the drawings and specific language will be used to describe the same. It will nevertheless be understood that no limitation of the scope of the disclosure is thereby intended, such alterations and further modifications in the illustrated system, and such further applications of the principles of the disclosure as illustrated therein being contemplated as would normally occur to one skilled in the art to which the disclosure relates.

It will be understood by those skilled in the art that the foregoing general description and the following detailed description are exemplary and explanatory of the disclosure and are not intended to be restrictive thereof. Throughout the patent specification, a convention employed is that in the appended drawings, like numerals denote like components.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures proceeded by "comprises . . . a" does not, without more constraints, preclude the existence of other devices or other sub-systems or other elements or other structures or additional devices or additional sub-systems or additional elements or additional structures.

Reference throughout this specification to "one embodiment", "an embodiment" or similar language means that a particular feature, structure, or characteristic described in connection with the embodiment is included in at least one embodiment of the present disclosure. Thus, appearances of the phrase "in one embodiment", "in an embodiment" and similar language throughout this detailed description may, but do not necessarily, all refer to the same embodiment.

The following discussion provides many example embodiments of the inventive subject matter. Although each embodiment represents a single combination of inventive elements, the inventive subject matter is considered to include all possible combinations of the disclosed elements. Thus if one embodiment comprises elements B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

FIG. 1 is a block diagram illustrating a work environment including plurality of robots and controllers in communication with each other. The work environment 100 includes a plurality of controller devices, hereinafter referred to as controllers, $102_1$, $102_2$ ... $102_x$ and so on, controlling a set of functional robots, hereinafter referred to as robots, $108_1$, $108_2$, $108_3$ ... $108_N$. Examples of such a work environment 100 may include, but not limited to, construction environments, home environments, office environments, parks, shopping centers, malls, processing and manufacturing plants, oil drilling and mining environments, refineries, flight and space environments, medical and microscopic environments or other type of environment. The controllers $102_1$, $102_2$ ... $102_x$ and the robots $108_1$, $108_2$, $108_3$ ... $108_N$ communicate with each other through a respective Robot user interface.

Generally, the controllers $102_1$, $102_2$ ... $102_x$ are handheld devices that may be operated by a user. Some examples of the handheld devices are smartphones, such as but not limited to, Android® based mobile phones, Smart Phones, iOS® based iPhones®, cellular phones, tablet media device, tablet computer (e.g. tablet PC), book reader, etc., as well as other types of handheld mobile devices with communication, computing and/or sensing capability.

The set of robots $108_1$, $108_2$, $108_3$ ... $108_N$ can include, but not limited to, from a wide-range of existing Robots such as a Pioneer 2® from ActivMedia Robotics, LLC of Amherst, N.H., to humanoid robots such as ASIMO® from Honda Motor Co., Ltd. of Japan, QRIO® from Sony Corp. of Japan, and PINO® from the Kitano Symbiotic Systems Project of the Japan Science and Technology Agency and so on.

As shown in FIG. 1, different controllers $102_1$, $102_2$ ... $102_x$ are communicatively coupled with one or more robots $108_1$, $108_2$, $108_3$ ... $108_N$. The communications between the controllers and the robots can be wired or wireless connections, such as a BlueTooth® connection, a radio frequency communication, an optical communication, etc. Each of the controllers $102_1$, $102_2$ ... $102_x$ includes a registration module $106_1$, $106_2$, ... $106_X$. The registration module communicates with a robot to generate a robot user interface $104_1$, $104_2$, $104_3$ ... $104_Y$ for controlling the robot. For example, the registration module $106_1$ in controller $102_1$ generates robot user interface $104_1$ to control robot $108_1$ and generates robot user interface $104_2$ to control robot $108_2$. Similarly, the registration module $106_2$ in controller $102_2$ generates its own robot user interface $104_4$ for controlling robot $108_2$ and robot user interface $104_5$ for controlling robot $108_3$. The robot user interfaces $104_1$, $104_2$, $104_3$ ... $104_Y$ generated by the registration modules $106_1$, $106_2$, ... $106_X$ in each of the controllers $102_1$, $102_2$ ... $102_x$ may or may not be the same. The differences in the robot user interfaces $104_1$, $104_2$, $104_3$ ... $104_Y$ arises, by way of non-limiting example, due to differences between the set of robots $108_1$, $108_2$, $108_3$ ... $108_N$, differences between various controllers $102_1$, $102_2$ ... $102_x$, differences in choices made by the user during the process of generation of the robot user interface $104_1$, $104_2$, $104_3$ ... $104_Y$ by the registration module $106_1$, $106_2$, ... $106_X$ etc. By way of example, such differences may arise due to differences in the function attributes of the set of robotic functions of a particular robot amongst the set of robots $108_1$, $108_2$, $108_3$ ... $108_N$ and also differences in the interface attributes of interface primitives of a particular controller amongst the plurality of $102_1$, $102_2$ ... $102_x$. The process of registering a new robot and generating a robot user interface for the new robot will be described in more detail below by reference to FIG. 2.

Figure 2:
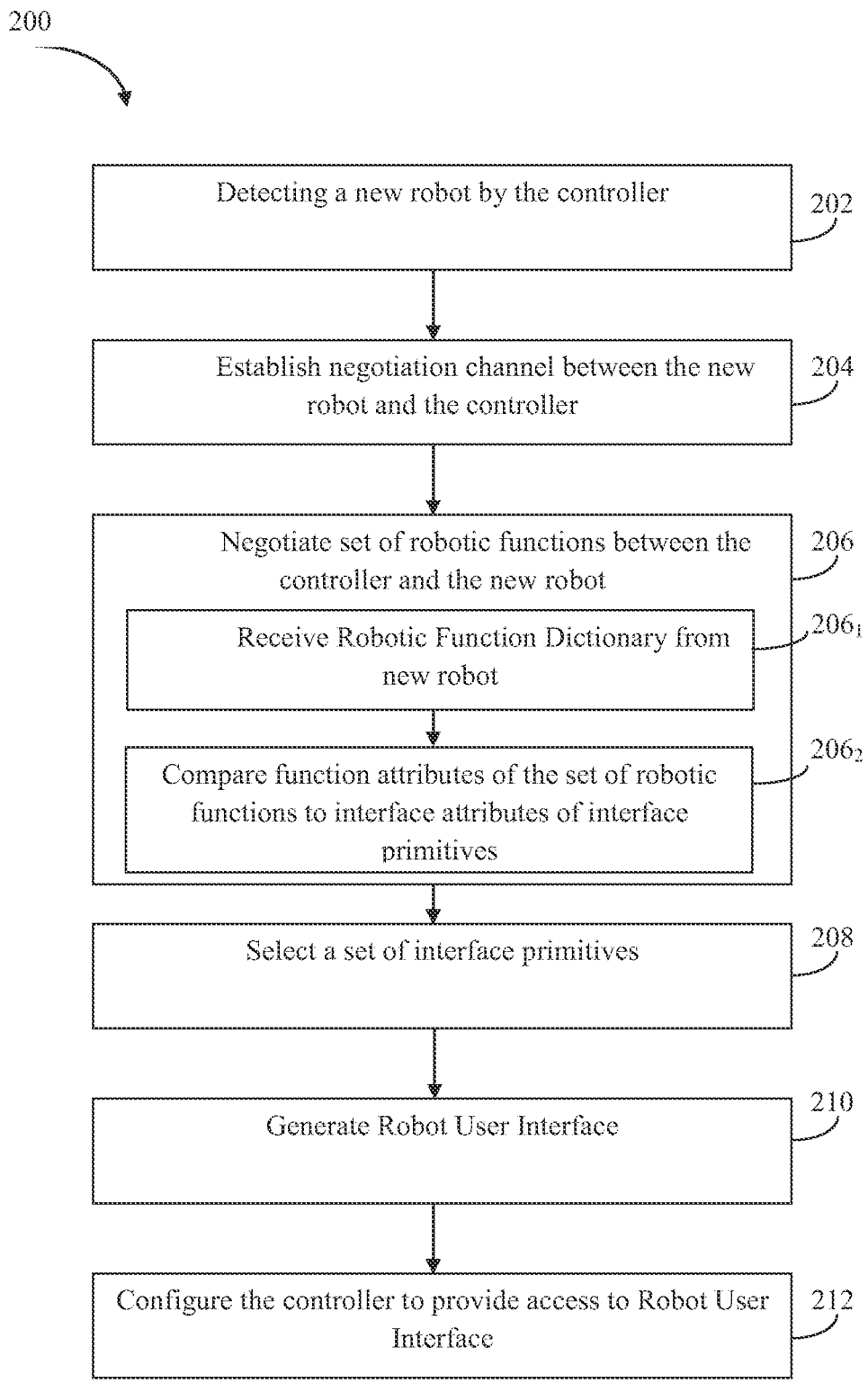
FIG. 2 illustrates a process of some embodiments for integrating a new robot into a work environment.

FIG. 2 illustrates a process 200 for integrating a new robot into a work environment, such as the work environment 100 depicted in FIG. 1.

At step 202, the presence of a new robot (e.g., robot $108_1$ referred to in FIG. 1) in the work environment is detected by a controller (e.g., controller $102_1$ referred to in FIG. 1). The presence of the new robot can be detected in many ways, in some embodiments, the new robot is configured to broadcast a signal to any controllers within the vicinity to announce its presence. Controllers in the vicinity of the new robot can pick up the signal of the new robot and begin the registration process with the new robot. For example, the robots can be detected through one or more discovery protocols e.g., Bluetooth discovery protocol, USB discovery protocol, UPnP protocol, etc.).

The new robot is integrated to operate for specific purposes in the work environment 100. Generally, a new robot may include a robot for which the controller has previously not been configured to control the robot. By way of example, a new robot may include, but not limited to, a robot that is deployed in the work environment and is to be controlled by a particular controller for the first time.

After detecting the presence of the new robot, the controller of some embodiments establishes (at step 204) a negotiation channel with the new robot. In some embodiments, the negotiation channel is a wireless communication channel and may be established in any conventional manner that is well known to the person skilled in the art. Such a communication channel may be established with the new robot $108_1$ via Infrared or any other suitable method of wireless communication including, but not limited to, wireless LAN, Bluetooth, 3G or 4G services, LMDS, WIMAX, and HiperMAN or any other suitable methods of wireless communication that may be developed in future, some embodiments, the negotiation channel includes a TCP/IP connection or session, through which the controller and new robot negotiate robotic functions.

Thereafter, at step 206, the controller negotiates a set of robotic functions with the new robot via the negotiation channel. In some embodiments, the negotiation involves receiving (at step $206_1$) a set of robotic functions stored in a robotic function dictionary from the new robot. The robotic function dictionary may be sent either automatically by the new robot on establishment of the negotiation channel or on receiving a request from the controller $102_1$. The robotic function dictionary generally comprises details of functions performable by the robot (hereinafter referred to as robotic functions or primitive robotic functions) and the manner in which the robotic functions can be controlled (i.e., functional attributes of a robotic function). By way of example, some of the robotic functions in the robotic function dictionary may include, but not limited to, robot motion (e.g., forward, backward, turn, etc.), motions of one or more parts of the robot, orientation of the robot or a part of the robot motion under obstruction, velocity of the robot or part thereof, linear and angular accelerations of the robot or part thereof, forces exerted by the robot or part thereof, etc. By way of example, the orientation of a robot or a part thereof can include roll, yaw and pitch of the robot or the part thereof, as the case may be. The robotic function dictionary may contain the functional attributes corresponding to at least some of the robotic functions, wherein the functional attribute is based on the nature of the function. For example, for a forward movement function of the new robot can include functional attributes such as a range of accelerations, a range of velocities, etc. On the other hand, a turn (rotate) movement function of the new robot can include functional attributes such as orange of turning degrees, etc.

At step $206_2$ on receiving the Robotic Function Dictionary, the function attributes of the received set of robotic functions are compared with interface attributes of the interface primitives by the controller. A different controller can have different interface primitives based on the controller's operating system, type of input device, type of output devices, type of sensors, and so on. Examples of different interface primitives include an On/Off switch, a slider, an accelerometer, a magnetometer, etc. More examples of interface primitives are described below by reference to FIG. 4.

At step 208, a set of interface primitives are selected based on the comparison of the function attributes of the robotic functions and interface attributes of the interface primitives. Software (which may be present in the controller) automatically selects the set of interface primitives. The selected sets of interface primitives can be used to control the robotic function under consideration. By way of example, for controlling a particular robotic function the output of this step could be a recommendation or suggestion of a set of interface primitives (i.e. a 1:N mapping recommendation). Such a recommendation of the set of interface primitives is provided for each of the robotic function respectively. However, there may be cases where no mapping recommendation may be provided with respect to one or more robotic functions.

At step 210, a robot user interface is generated from the set of interface primitives recommended at step 208. Once 1:N mapping is suggested at step 208, the software alone or along with participation by the user can proceed to make a 1:1 mapping. The 1:1 mapping generally indicates mapping of one interface primitive from amongst the set of primitives recommended at step 208 to control a particular robotic function. In case the mapping suggested is 1:1, i.e. only one interface primitive is recommended to control a particular robotic function, the user may accept the mapping or choose a different mapping (which is not in the choice suggested). In case the mapping does not provide any suggestion, the user can manually make an appropriate choice based on his understanding the nature of the function or decide not to control the functionality through the controller). Thereafter, the software will proceed to generate code corresponding to the robot user interface with the functionality for controlling the robot. The process for generating the codes may be performed, by way of example, in a manner as disclosed in U.S. Pat. No. 8,060,251 to Kenneth A. Berger et al., titled "System and Method For Generating User Interface Code" filed Jan. 16, 2002, which discloses systems and methods that generate a user interface code that causes the selected user interface features and associated states for the user interface features to be generated. The codes upon execution will generate the robot user interface. At step 212, the controller is configured to provide access of the robot user interface thus generated above to a user for controlling the new robot within the work environment 100.

Figure 3:
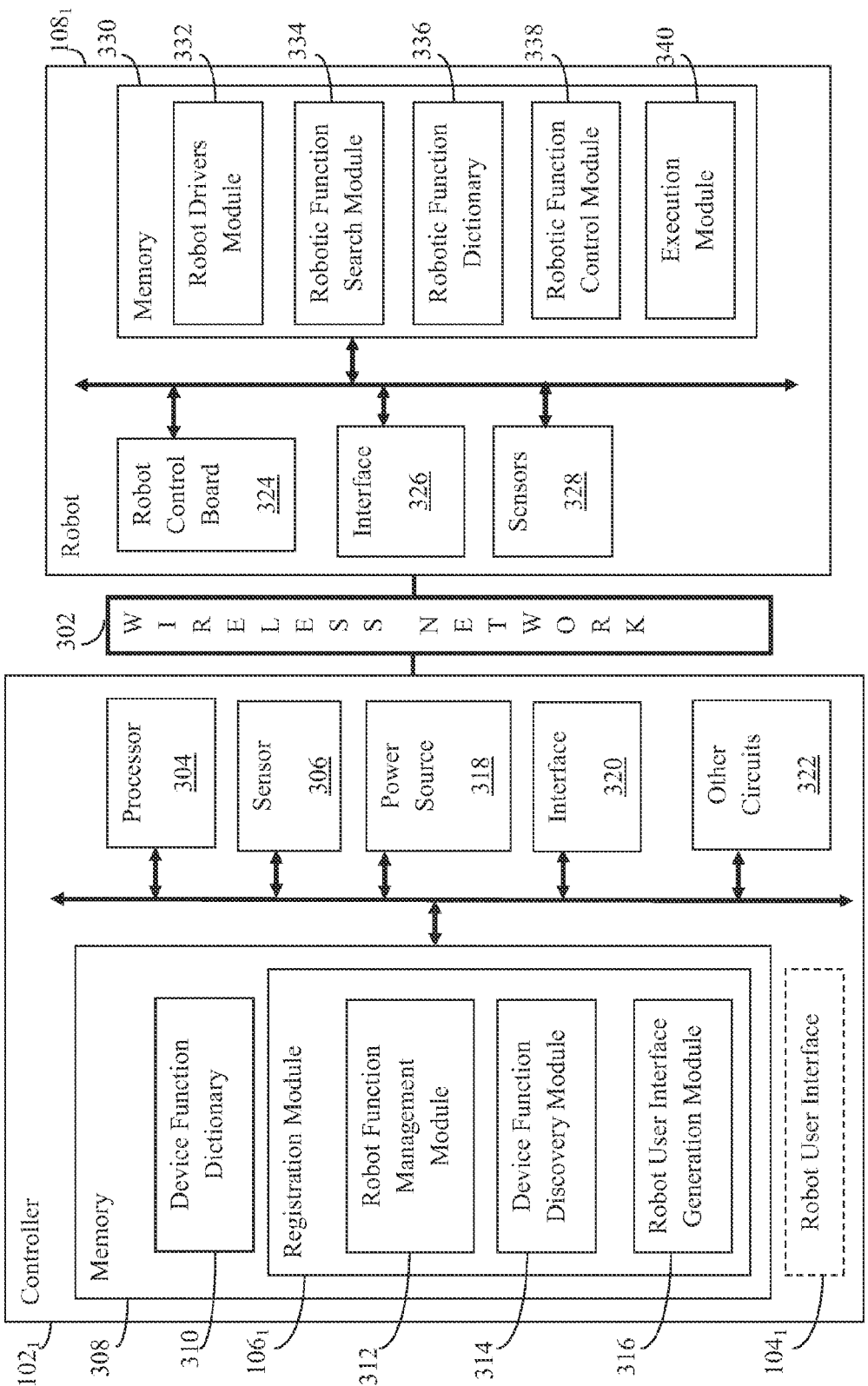
FIG. 3 illustrates a detailed block diagram of a controller and a robot of some embodiments.

FIG. 3 illustrates a detailed block diagram of the controller and the robot of some embodiments. As shown in FIG. 3, the controller $102_1$ and the robot $108_1$ communicate with each other through a wireless network 302. The controller $102_1$, the wireless network 302, and the robot $108_1$ represent groups of functionality and can be implemented in only hardware, only software, or a mixture of both. In addition, while they are illustrated as separate components and modules in FIG. 3, the functionality of multiple components and modules can be provided by a single software application or hardware device. Alternatively, the functionality of one component or module can be provided by multiple software applications or hardware devices.

The controller $102_1$ of some embodiments includes a processor 304 for communicating with the robot $108_1$, processing user inputs through the robot user interface, and executing the commands for controlling the robot $108_1$. The controller $102_1$ also includes a set of sensors 306 for generating sensor data based on their sensing capabilities, a memory 308 for storing software modules such as, a device function dictionary 310 which is generally a repository of various interface primitives and their corresponding attributes of the controller $102_1$, and a registration module $106_1$ for generating a robot user interface $104_1$ for controlling the robot $108_1$. The registration module $106_1$ further includes a robotic function management module 312, a device function discovery module 314 and a robot user interface generation module 316. The commands contained in various software modules are executed by the processor 304. The controller $102_1$ may further include a power source 318 to supply requisite energy for the controller $102_1$. The controller $102_1$ may additionally include an interface 320 and one or more other circuits 322 for performing other actions.

The robot $108_1$ includes a robot control board 324 that may include an electronic circuitry that is fabricated on a board that powers and controls the robot $108_1$, an interface 326 to display a connectivity prompt that allows a user to grant access to the robot $108_1$, a set of sensors 328 that gather information about the robot's activities and its environment, a memory 330 for storing software modules, such as, but not limited to, robot drivers module 332, robotic function dictionary 336, robotic function search module 334, robotic function control module 338 and an execution module 340, that governs the functioning of the robot $108_1$. The functional, operational and configuration details of each of the components shall be discussed in detail in the following paragraphs of the description.

The set of sensors, hereinafter referred to as sensors 306, receive information about the surrounding environment. The sensors 306, may include, but not limited to, an accelerometer, magnetometer, a temperature sensor, a touch sensitive surface, a barometer, detection sensors and so on. Such sensors 306 are configured to sense position, location (e.g., GPS), motion, temperature, weather, project, altitude, and so on. In some embodiments, the set of sensors 306 includes communication interface (e.g., wireless communication interface) that is configured to receive and sends electronic signals with robots. The presence of the robot $108_1$ can be detected by receiving the robot's broadcasting signal via the communication interface.

The interface 320 is configured to enable the user to communicate with the robot $108_1$ and may include, but, not limited to a panorama display, a joystick or direct drive controls, a status bar, camera control, and sensor controls and so on. The display may present a displayable user interface that may include a set of user selectable items. One skilled in the art will recognize that an interface can be designed to meet the particular needs of the user, altering both the content of the interface and the placement of any element within the display.

Once the presence of the robot $108_1$ is detected, the registration module $106_1$ is invoked by the processor 304 for further communication with the robot $108_1$. As aforesaid, the registration module $106_1$ generally includes software modules/libraries comprised of, for example, a robotic function management module 312, a device function discovery module 314 and a robot user interface generation module 316.

The robotic function management module 312 generally establishes the negotiation channel with the robot $108_1$. The negotiation channel may generally be used for negotiation of robotic functions between the robot $108_1$ and the controller $102_1$. By way of example, the term negotiation involves receiving a set of robotic functions from the robot $108_1$ and comparing the interface attributes of the interface primitives of robot $108_1$ with attributes of each of the robotic functions. The robotic function management module 312, on establishment of negotiation channel with the robot $108_1$, triggers the robotic function search module 334 stored in the memory 330 of the robot $108_1$. The robotic function search module 334 may include a searching algorithm that searches the robotic function dictionary 336 and provides a set of robotic functions for negotiation with the controller $102_1$.

The robotic function dictionary 336 includes details about the set of robotic functions and their attributes. The set of robotic functions may include primitive robotic functions and non primitive robotic functions that are generated from the primitive robotic functions. The robotic function dictionary 336 may also include description about the robots physical characteristics, its environment, the expected interaction between the robot and its environment. In one embodiment, the robotic function dictionary 336 includes definitions of various robotic functions that is a collection of parameters of the robot $108_1$ and its configuration that describe, for example, how many motors, how many wheels, the size of the wheels, what appendages and linkages exist, what is the range of motion, what is the total robot mass and what are its dimensions and so on. In one embodiment, a set of non-primitive robotic functions may be generated from set of robotic functions.

On receiving a robotic function amongst the set of robotic functions, the robotic function management module 312 triggers the device function discovery module 314 to provide a set of interface primitives along with their attributes. The device function discovery module 314 may include a searching algorithm that searches the device function dictionary 310 and provides with the interface primitives i.e. functions and features of the controller $102_1$ along with their corresponding attributes. The process of providing the set of interface primitives and their corresponding attributes from the device function dictionary 310 by the device function discovery module 314 is repeated for the entire set of robotic functions.

The device function dictionary 310 is generally stored in controller $102_1$ and includes various attributes and functions of the controller $102_1$, such as, but not limited to, type of operating system and its version, type of keypad, type of sensors, type of screen and so on. The device function dictionary 310 captures and stores the attributes relating to functionality and features of the controller $102_1$, such as, but not limited to, type of operating systems, such as Android®, iOS®, Symbian® or other mobile platforms, type of keypad, type of sensors, type of input/output devices, number of i/o ports and so on. The device function dictionary 310 may also include attributes relating to various types of Smartphone functionalities such as, but not limited to, camera-front, back, video; Location-GPS, geotagging, altimeter, atmospheric pressure sensors; Movement-3D Accelerometer, Digital Compass, gyroscope; Audio-microphone; Text-email, reminders, notes, calendars and so on. The device function dictionary 310 may be modified and updated by the user or automatically from time to time. Once the interface primitives and their corresponding attributes are provided for the entire set of robotic functions, the control is again transferred back to the robot function management module 312.

The robotic function management module 312 is further configured to provide possible control options and/or recommendations for controlling the robot $108_1$. The recommendations generally include providing one or more possible ways for controlling each of the robotic functions in the set. The recommendations generally involve mapping "N" interface primitives that may be used to control each of the robotic functions in the set (i.e. for a robotic function, N possible interface primitives). The recommendations are result of the comparison between the function attributes of robotic functions and interface attributes of the interface primitives.

In one embodiment, the robot function management module 312 may be configured to provide rankings to the recommendations based on the ease of controlling a particular robotic function. The aforesaid process is repeated for every robotic function, desired to be controlled via the controller $102_1$ (i.e. every robotic function present in the set of robotic functions provided by the robotic function search module 334). The recommendations generated by the robot function management module 312 may be displayed onto the display for user's reference. Generally, different recommendations are provided for controlling different robotic functions. In an alternate embodiment, the robot function management module 312 may be configured to provide identical recommendations to control two or more robotic functions. In certain cases, robot function management module 312 may further be configured to provide no recommendations for controlling a particular robotic function.

The robotic function management module 312 further includes algorithms so as to select a particular interface primitive from amongst the various recommendations provided for controlling a particular robotic function. Such a selection is generally done automatically based on the ranking given to the recommendations. In alternate embodiments, the user may be allowed to make a selection from amongst the recommendations displayed to him on the display by the robotic function management module 312. The robotic function management module 312 may further be configured to allow the user to select an interface primitive based on his own choice irrespective of the recommendations displayed to him on the display. Once the interface primitives are selected by the user or automatically by the robotic function management module 312, the control is transferred to the robot user interface generation module 316 for generating a Robot user interface.

The robot user interface generation module 316 generates codes, based on the selected interface primitives, which upon execution generate a robot user interface $104_1$. By way of example, separate buttons can be selected to make the robot $108_1$ do specific functions ("Pick up the Tools used at a construction site") or to move the robot $108_1$ in specific patterns ("go two meters forward, then turn 45 degrees to the left") or a button may be used to automatically have the robot $108_1$ rotate to the angular direction in which the camera is currently pointed and so on.

In one embodiment, the robot user interface generation module 316 may generate codes which on execution create a small icon indicating that the robot user interface $104_1$ has been generated. The robot user interface generation module 316 is further configured to provide access to the user for controlling the robot $108_1$ using the robot user interface $104_1$ thus generated. By way of example, the user may access the robot user interface $104_1$ by clicking the icon created by the robot user interface generation module 316 and control the robot $108_1$ and its functionality by using the various buttons provided on the Robot Use Interface $104_1$.

In one embodiment, the robot user interface generation module 316 may generate codes which upon execution may generate robot user interface $104_1$ that may include a scale selection tool for selecting a value within a predetermined scale. Such a scale selection tool is configured to allow the user to select a particular value in order to control the robot $108_1$ to an extent that corresponds to the value selected within that tool. For example, if a particular part of a robot $108_1$ is rotatable between 45 to 90 degrees, a scale ranging from 45-90 degrees may be provided to control the rotation of the robot $108_1$ within the range. If the user provides a value beyond the scale, an error notification can be shown to the user. A selection, for example, of 50 degrees on the tool may generate a command to rotate the robot $108_1$ by 50 degrees.

In an alternate embodiment, the robot user interface generation module 316 may generate codes which upon execution may generate a Handoff icon. An access to such an icon may automatically transfer the control of the robot $108_1$ from one controller to the other. By way of example, a click on such an icon may send a notification to both of the controllers that the handoff has taken place.

The robot driver module 332 includes set of software drivers and/or libraries that govern the functioning of the robot $108_1$. The robot driver module 332 interfaces between the controller $102_1$ and other software modules (such as robotic function control module 338, execution module 340, etc.) of the robot $108_1$. The robot driver module 332 receives data from other software modules or sensors and is responsible for channeling the same to the interface 326 for transmission to the controller $102_1$.

The robotic function control module 338 that forms part of the robot $108_1$ interprets the commands received from the controller $102_1$ and translates them into robot commands. Alternatively, the commands from the controller $102_1$ may be in a form which is directly executable by the robot $108_1$ (without any translations). The robotic function control module 338 then sends the robot commands as received or as received and translated) to the execution module 340 for execution. The execution module 340 may be capable of performing computations, such as breaking a complex command to a series of simpler commands executable by the robot. By way of example, interpreting a command from the controller $102_1$ to move the robot $108_1$ forward ten centimeters may be interpreted to arrive at a command to spin a motor ten times. This computational ability to the execution module 340 may be provided to relieve the controller $102_1$ of the need to be aware of the complete command set available at the robot $108_1$ or to enable the controller $102_1$ to provide a higher level and complex command to the robot $108_1$.

The present disclosure may be illustrated by way of examples and scenarios in the following paragraphs. The following examples and scenarios are provided to illustrate the merits of the exemplary embodiment of the invention, and should not be construed as limiting the scope of the present disclosure.

In a scenario where a robot, for example robot $108_1$ is in the vicinity of a controller device, for example controller $102_1$ which has not been configured before to control this robot $108_1$. Once the robot $108_1$ enters into the vicinity of the controller $102_1$, a signal is received by the sensors 306 of controller $102_1$ indicating the presence of the robot $108_1$. A negotiation channel is established by the registration module $106_1$ of the controller $102_1$ with the robot $108_1$. The robot $108_1$ includes a robotic function dictionary 336 having various details, for example definitions, attributes etc. of the robotic functions that may be performed by the robot $108_1$, such as details relating to its movements, orientation, sensors and so on. The set of robotic functions from the robotic function dictionary 336 are negotiated with the controller $102_1$ via this negotiation channel. Once a robotic function from amongst the set of robotic functions is received by the controller $102_1$, the device function discovery module 314 in the registration module $106_1$ identifies the various interface primitives features, functionalities along with their corresponding attributes from the device function dictionary 310.

An example of the device function dictionary 310 that may exist in various controllers available in the market is illustrated in FIG. 4. FIG. 4 depicts a list of various interface primitives i.e. features, functionalities, sensors, type of i/o means etc. available in various controllers/controller devices. For the purposes of explaining the present invention with reference to the present example, the device function dictionary corresponding to controller1 (referred to as controller $102_1$) has been considered.

As can be seen in FIG. 4, the controller $102_1$ includes a direction sensor such as a 3D accelerator that is capable of detecting direction of movement of the controller $102_1$, and generating direction data accordingly. The direction data indicates a position shift of controller $102_1$. The direction data may indicate a position shift of the controller $102_1$ and includes an X-axis acceleration, a Y-axis acceleration, and a. Z-axis acceleration. The X-axis acceleration may indicate a left-right position shift quantity, the Y-axis acceleration may indicate a forward-backward position shift quantity, and the Z-axis acceleration may indicate an up-down position shift quantity of the controller1 $102_1$ and so on.

Once the various interface primitives pertaining to controller $102_1$ are identified, various recommendations depicting one or more options for controlling various robotic functions are displayed to the user for his reference. An example of the recommendations made by the registration module $106_1$ of controller $102_1$ is illustrated in FIG. 5. Different control options and recommendations for controlling the movements and/or functions of the robot $108_1$ are provided, such as, to make the robot $108_1$ to move left, right, forward or backward, the controller $102_1$ may be tilted in the corresponding directions on a horizontal plane or may be controlled using the keypad keys or a four-arrow icon (left, right, forward and backward) on the touch display may be used. Further, use of different keys on the keypad such as, Long Press of the 0 key or any other key may be provided to turn the robot $108_1$ ON or Off and so on. The various control options are provided by way of example and should not be construed to limit the scope of the invention. One skilled in the art wilt recognize that many such control options for controlling the movement and functioning of the robot $108_1$ can be utilized alone or in various combinations.

Once the various control options and recommendations are provided, a robot user interface $104_1$ is generated based on the selection of particular interface primitive for control a particular robotic function. An example of interface primitives selected from the recommendations provided for controlling different robotic functions by controller $102_1$ has been illustrated in FIG. 6. One skilled in the art will recognize that many such Robot user interfaces for controlling the function of the robot $108_1$ can be generated using various combinations.

Figure 7:
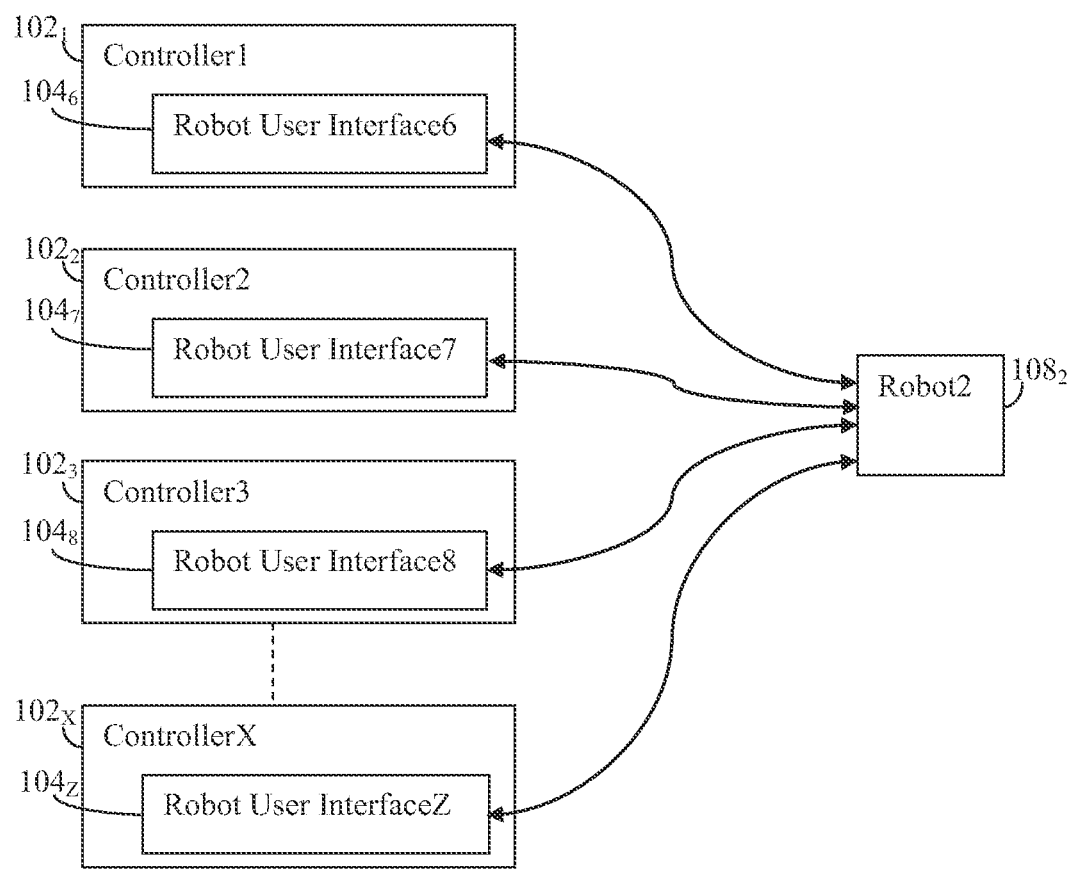
FIG. 7 illustrates an example robot of some embodiments that can be controlled by different controllers using different interfaces.

FIG. 7 illustrates a scenario wherein a robot, for example robot2 $108_2$ may be controlled by plurality of heterogeneous controllers $102_1, 102_2, 102_3 \ldots 102_x$. Each of the plurality of the controller $102_1, 102_2, 102_3 \ldots 102_x$ generates its respective robot user interface $104_6, 104_7, 104_8 \ldots 104_Z$ respectively according to the present disclosure for controlling the same robot $108_2$. For example, controller1 $102_1$ generates Robot user interface6 $104_6$ for controlling robot $108_2$, controller2 $102_2$ generates Robot user interface7 $104_7$ for controlling the same robot $108_2$ and so on. Thus, each of the heterogeneous controllers $102_1, 102_2, 102_3 \ldots 102_x$ provides a different robot user interface $104_6, 104_7, 104_8 \ldots 104_Z$ for controlling the same robot $108_2$.

Figure 8:
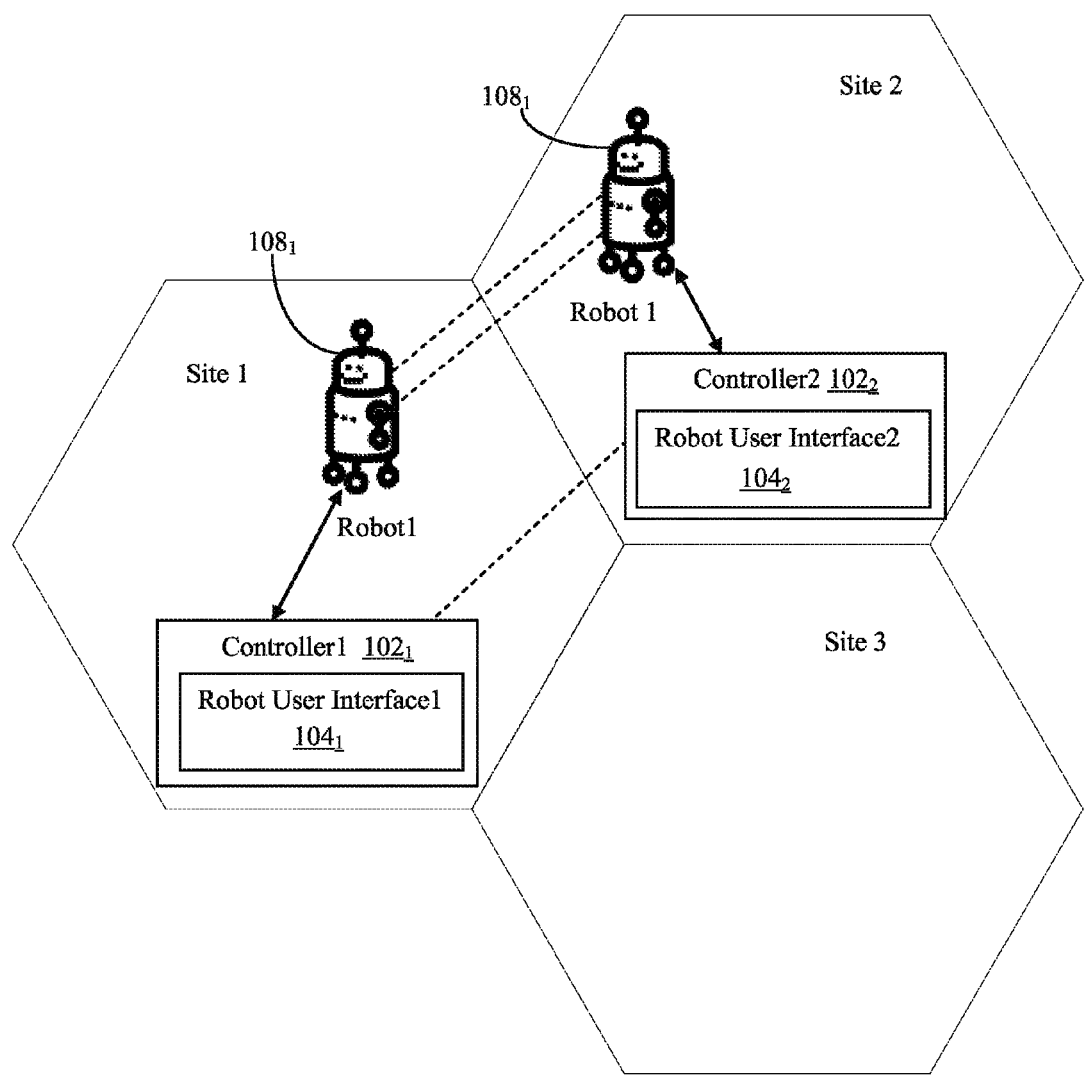
FIG. 8 illustrates a handoff from one controller to another to control the same robot.

FIG. 8 depicts a control handoff from one controller to the other to control the same robot. As illustrated in the figure, robot1 $108_1$ is initially assigned to work in site 1. Robot1 $108_1$ is initially controlled by controlled $102_1$ through Robot user interface1 $104_1$ generated according to the present disclosure. The controller2 $102_2$ which is present in site 2 has already been configured previously to control robot $108_1$ using Robot user interface2 104₂. Thus, when robot1 108₁ moves to Site 2, a handoff takes place from controller1 102₁ to controller2 102₂ for controlling the same robot 108₁. Such a handoff may take place by clicking the handoff icon that may be generated during the process of generation of the Robot user interfaces by the respective controllers 102₁, 102₂. The handoff allows user or a site operator in Site 2 to quickly have access to the robot, i.e. robot1 108₁ using controller2 102₂.

The robot user interface thus generated according to the present disclosure allows a user to monitor and have control over the robots more quickly, intuitively using their own controller. The ability of the controllers to generate their own Robot user interfaces to control the robots intuitively enables the user or the operator or site manager to quickly monitor the actions of robots and also have access to the details captured by the robot.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A method of integrating a new robot into a work environment, comprising:
   receiving, by a controller, a signal indicating a presence of the new robot in the work environment;
   in response to the signal, establishing a negotiation channel between the controller and the new robot;
   receiving, by the controller via the negotiation channel, a dictionary comprising definitions of a set of primitive robotic functions from the new robot;
   negotiating, by the controller via the negotiation channel, with the new robot a set of robotic functions controllable by the controller, wherein the set of robotic functions comprises a set of non-primitive robotic functions generated from the set of primitive robotic functions;
   selecting a set of selected interface primitives by comparing function attributes of the set of robotic functions to interface attributes of interface primitives;
   generating a robot user interface, by the controller, from the set of selected interface primitives, wherein the robot user interface is configured to control the set of robotic functions; and
   configuring the controller to provide access to the robot user interface within the work environment.

2. The method of claim 1, wherein the work environment comprises a plurality of heterogeneous robots and a plurality of heterogeneous controllers, wherein each of the plurality of heterogeneous controllers is configured to provide a different robot user interface for controlling a different robot.

3. The method of claim 2, wherein each of the plurality of heterogeneous controllers is configured to provide a different robot user interface for controlling a same robot.

4. The method of claim 1, wherein configuring the controller comprises configuring a display of the controller to present a displayable user interface.

5. The method of claim 4, wherein the displayable user interface comprises a set of user selectable interface items.

6. The method of claim 5, further comprising:
   receiving a selection of a user selectable interface item; and
   generating a command that engages a robotic function based on the selected user interface item.

7. The method of claim 1, wherein configuring the controller comprises enabling the controller to generate commands that engage the set of robotic functions based on sensor data from a sensor and obtained by the controller.

8. The method of claim 7, wherein the controller comprises the sensor.

9. The method of claim 7, wherein the sensor data comprises at least one of the following: position data, location data, orientation data, motion data, temperature data, weather data, project data, and altitude data.

10. The method of claim 7, wherein the sensor comprises at least one of the following: an accelerometer, a magnetometer, a temperature sensor, a touch sensitive surface, and a barometer.

11. The method of claim 1, wherein the robot user interface comprises a scale selection tool for selecting a value within a predetermined scale.

12. The method of claim 11, further comprising:
   receiving a selection of a particular value via the scale selection tool; and
   generating a command that engages a robotic function at an extent corresponding to the particular value within the predetermined scale.

13. The method of claim 1, wherein the controller is communicatively coupled with the new robot via a wireless interface.

14. The method of claim 1, further comprising:
   receiving, by the controller, another signal indicating a presence of a different robot; and
   generating, by the controller, a different robot user interface configured to control a set of robotic functions for the different robot.

15. The method of claim 1, wherein the work environment is a construction environment.

16. A controller device for integrating a new robot into a work environment, the controller device comprising:
   an interface configured to communicate with a robot; and
   a registration module coupled with the interface and configured to:
      receive a signal indicating a presence of the new robot in the working environment, establish a negotiation channel with the new robot via the interface,
      receive, via the negotiation channel, a dictionary comprising definitions of a set of primitive robotic functions from the new robot,
      negotiate, via the negotiation channel, with the new robot a set of robotic functions controllable by the controller device, wherein the set of robotic functions comprises a set of non-primitive robotic functions generated from the set of primitive robotic functions,
      select a set of selected interface primitives by comparing function attributes of the set of robotic functions to interface attributes of interface primitives, generate a robot user interface from the set of selected interface primitives, wherein the robot user interface is configured to control the set of robotic functions, and configure the controller device to provide access to the robot user interface within the work environment.

17. The controller device of claim 16, wherein the controller device is one of a plurality of heterogeneous controller devices in the work environment and wherein each of the plurality of heterogeneous controller devices is configured to provide a different robot user interface for controlling the new robot.

18. The controller device of claim 16, wherein the registration module is further configured to (i) receive another signal indicating a presence of a different robot and (ii) generate a different robot user interface configured to control a set of robotic functions for the different robot.

19. The controller device of claim 16, wherein the work environment is a construction environment.

* * * * *